United States Patent
Greiner et al.

(10) Patent No.: US 7,120,334 B1
(45) Date of Patent: Oct. 10, 2006

(54) OPTICAL RESONATOR FORMED IN A PLANAR OPTICAL WAVEGUIDE WITH DISTRIBUTED OPTICAL STRUCTURES

(75) Inventors: Christoph M. Greiner, Eugene, OR (US); Dmitri Iazikov, Springfield, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/213,345

(22) Filed: Aug. 25, 2005

Related U.S. Application Data

(60) Provisional application No. 60/604,827, filed on Aug. 25, 2004.

(51) Int. Cl.
*G02B 6/34* (2006.01)
*G03H 1/10* (2006.01)
*H04J 14/02* (2006.01)

(52) U.S. Cl. .............................. 385/37; 385/3; 385/14; 385/129; 359/10; 359/15; 359/34; 398/79; 398/84; 398/87

(58) Field of Classification Search .................. 385/37
See application file for complete search history.

(56) References Cited

U.S. PATENT DOCUMENTS

| | | | |
|---|---|---|---|
| 3,995,937 A | 12/1976 | Baues et al. | |
| 4,006,967 A | 2/1977 | Kenan et al. | |
| 4,140,362 A | 2/1979 | Tien | |
| 4,387,955 A | 6/1983 | Ludman et al. | |
| 4,440,468 A | 4/1984 | Auracher et al. | |
| 4,660,934 A | 4/1987 | Akiba et al. | |
| 4,740,951 A | 4/1988 | Lizet et al. | |
| 4,743,083 A | 5/1988 | Schimpe | |
| 4,746,186 A | 5/1988 | Nicia | |
| 4,773,063 A | 9/1988 | Hunsperger et al. | |
| 4,786,133 A | 11/1988 | Gidon et al. | |
| 4,803,696 A | 2/1989 | Pepper et al. | |
| 4,824,193 A | 4/1989 | Maeda et al. | |
| 4,834,474 A | 5/1989 | George et al. | |
| 4,846,552 A | 7/1989 | Veldkamp et al. | |
| 4,852,960 A | 8/1989 | Alferness et al. | |
| 4,923,271 A | 5/1990 | Henry et al. | |
| 4,938,553 A | 7/1990 | Maerz et al. | |
| 5,040,864 A * | 8/1991 | Hong | 385/16 |
| 5,107,359 A | 4/1992 | Ohuchida | |
| 5,165,104 A | 11/1992 | Weverka | |
| 5,195,161 A | 3/1993 | Adar et al. | |

(Continued)

FOREIGN PATENT DOCUMENTS

EP  0 310 438 A1  4/1989

(Continued)

OTHER PUBLICATIONS

Capron et al, J. Lightwave Tech., vol. 11 No. 12 pp. 2009-2014 (Dec. 1993).

(Continued)

*Primary Examiner*—Sung Pak
*Assistant Examiner*—Tina M Wong
(74) *Attorney, Agent, or Firm*—David S. Alavi

(57) ABSTRACT

An optical apparatus comprises a planar optical waveguide having at least two sets of diffractive elements. The planar optical waveguide substantially confines in at least one transverse spatial dimension optical signals propagating therein. The two diffractive element sets define an optical resonator that supports at least one resonant optical cavity mode. An optical signal in one of the resonant optical cavity modes is successively incident on the diffractive elements of each of the diffractive element sets.

38 Claims, 9 Drawing Sheets

U.S. PATENT DOCUMENTS

| | | | |
|---|---|---|---|
| 5,357,591 | A | 10/1994 | Jiang et al. |
| 5,450,511 | A | 9/1995 | Dragone |
| 5,768,450 | A | 6/1998 | Bhagavatula |
| 5,812,318 | A | 9/1998 | Babbitt et al. |
| 5,830,622 | A | 11/1998 | Canning et al. |
| 6,011,884 | A | 1/2000 | Dueck et al. |
| 6,011,885 | A | 1/2000 | Dempewolf et al. |
| 6,137,933 | A | 10/2000 | Hunter et al. |
| 6,144,480 | A | 11/2000 | Li et al. |
| 6,169,613 | B1 | 1/2001 | Amitai et al. |
| 6,169,614 | B1 | 1/2001 | Whitcomb et al. |
| 6,285,813 | B1 | 9/2001 | Schultz et al. |
| 6,323,970 | B1 | 11/2001 | Popovich |
| 6,473,232 | B1 | 10/2002 | Ogawa |
| 6,553,162 | B1 | 4/2003 | Okayama |
| 6,678,429 | B1* | 1/2004 | Mossberg et al. .............. 385/10 |
| 6,702,897 | B1 | 3/2004 | Cullen et al. |
| 6,823,115 | B1 | 11/2004 | Greiner et al. |
| 6,829,417 | B1* | 12/2004 | Greiner et al. ................. 385/37 |
| 6,859,318 | B1 | 2/2005 | Mossberg |
| 6,879,441 | B1* | 4/2005 | Mossberg ................... 359/569 |
| 6,961,491 | B1 | 11/2005 | Greiner et al. |
| 6,965,464 | B1 | 11/2005 | Mossberg |
| 6,965,716 | B1 | 11/2005 | Greiner et al. |
| 6,985,656 | B1 | 1/2006 | Iazikov et al. |
| 6,987,911 | B1 | 1/2006 | Mossberg et al. |
| 6,990,276 | B1 | 1/2006 | Brice et al. |
| 6,993,223 | B1 | 1/2006 | Greiner et al. |
| 7,009,743 | B1 | 3/2006 | Mossberg |
| 7,054,517 | B1 | 5/2006 | Mossberg et al. |
| 7,062,128 | B1 | 6/2006 | Mossberg |
| 2003/0039444 | A1 | 2/2003 | Mossberg et al. |
| 2003/0117677 | A1 | 6/2003 | Mossberg |
| 2004/0076374 | A1 | 4/2004 | Greiner et al. |
| 2004/0131360 | A1 | 7/2004 | Iazikov et al. |
| 2004/0170356 | A1 | 9/2004 | Iazikov et al. |
| 2004/0173680 | A1 | 9/2004 | Mossberg et al. |
| 2004/0179779 | A1 | 9/2004 | Greiner et al. |
| 2004/0208466 | A1 | 10/2004 | Mossberg et al. |
| 2004/0258356 | A1 | 12/2004 | Brice et al. |
| 2005/0018951 | A1 | 1/2005 | Mossberg et al. |
| 2005/0063430 | A1* | 3/2005 | Doucet et al. ................. 372/23 |
| 2005/0078912 | A1 | 4/2005 | Iazikov et al. |
| 2005/0135744 | A1 | 6/2005 | Greiner et al. |
| 2005/0135745 | A1 | 6/2005 | Greiner et al. |
| 2005/0135747 | A1 | 6/2005 | Greiner et al. |
| 2005/0152011 | A1 | 7/2005 | Mossberg |
| 2005/0163425 | A1 | 7/2005 | Greiner et al. |
| 2006/0023280 | A1 | 2/2006 | Mossberg |

FOREIGN PATENT DOCUMENTS

| | | |
|---|---|---|
| GB | 2 168 215 A | 6/1986 |
| WO | WO-99/35523 A1 | 7/1999 |
| WO | WO-99/56159 A1 | 11/1999 |
| WO | WO 02-075411 | 9/2002 |

OTHER PUBLICATIONS

Deri et al, IEEE Photonics Tech. Lett., vol. 6 No. 2 pp. 242-244 (Feb. 1994).
Grunnet-Jepsen et al, Electon. Lett., vol. 35 No. 13 pp. 1096-1097 (Jun. 1999).
Paddon et al, Opt. Lett., vol. 23 No. 19 pp. 1529-1531 (1998).
Madsen et al, IEEE J. Sel. Top. Quant. Elec., vol. 4 No. 6 pp. 925-929 (Nov./Dec. 1998).
Gini et al, J. Lightwave Tech., vol. 16 No. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., vol. 7 No. 3 pp. 324-326 (Mar. 1995).
Takenouchi et al, Optics Express, vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron. Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl. Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron. Lett., vol. 29 No. 9 p. 805 (Apr. 1993).
Li. Opt. Commum., vol. 114 pp. 406-412 (1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).
Cowin et al Electron. Lett., vol. 35 No. 13 pp. 1074-1076 (Jun. 1999).
Canning et al, Opt. Commun., vol. 171 pp. 213-217 (1999).
Tien et al, Use of concentric-arc grating as a thin-film spectrograph for guided waves, Am. Inst. of Physics (1980) pp. 524-525.
Kaneko et al, IEEE J. Sel. Top. Quant. Elec., vol. 5 No. 5 pp. 1227-1336 (Sep./Oct. 1999).
Sun et al, IEEE Photonics Tech. Lett., vol. 10 No. 1 pp. 90-92 (Jan. 1998).
McGreer, IEEE Photonics Tech. Lett., vol. 8 No. 4 pp. 551-553 (Apr. 1996).
Avrutsky et al, IEEE Photonics Tech. Lett., vol. 10 No. 6 pp. 839-841 (Jun. 1998).
Alavie et al, IEEE Photonics Tech. Lett., vol. 5 No. 9 pp. 1112-1114 (Sep. 1993).
Fu et al, Opt. Lett., vol. 22 No. 21 pp. 1627-1629 (1997).
Wang et al, IEEE Photonics Tech. Lett., vol. 3 No. 1 pp. 36-38 (Jan. 1991).
Wang et al Opt. Lett., vol. 15 No. 17 pp. 363-365 (Apr. 1990).
Wu et al, J. Lightwave Tech., vol. 10 No. 11 pp. 1575-1589 (Nov. 1992).
Eldada et al, IEEE Photonics Tech. Lett., vol. 12 No. 7 pp. 819-821 (Jul. 2000).
Chen et al, J. Lightwave Tech., vol. 10 No. 7 pp. 888-897 (Jul. 1992).
Minier et al, Diffraction characateristics of superimposed holographic gratings in planar optical waveguides, IEEE Photonics Tech. Lett., vol. 4 No. 10 p. 1115 (Oct. 1992).
Miya, IEEE J. Sel. Top. Quant. Elec., vol. 6 No. 1 pp. 38-45 (Jan./Feb. 2000).
Backlund et al, IEEE Photonics Tech. Lett., vol. 12 No. 3 pp. 314-316 (Mar. 2000).
Wiesman et al, IEEE Photonics Tech. Lett., vol. 12 No. 6 pp. 639-641 (Jun. 2000).
Ura et al, Integrated optical wavelength demultiplexer using a coplanar grating lens, Appl. Opt., vol. 29 No. 9 pp. 1369-1373 (Mar. 1990).
Chen et al, Ten channel single-mode wavelength division demultiplexer in the near IR, Integrated Optical Circuits, vol. 1583 pp. 134-142 (Intl. Opt. Eng., Boston, MA, USA, Sep. 1991).
Babbitt et al, Opt. Lett., vol. 20 No. 8 pp. 910-912 (Apr. 1995).
Mossberg, Opt. Lett., vol. 26 No. 7 pp. 414-416 (Apr. 2001).
Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

Hirayama et al, Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson et al, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

* cited by examiner

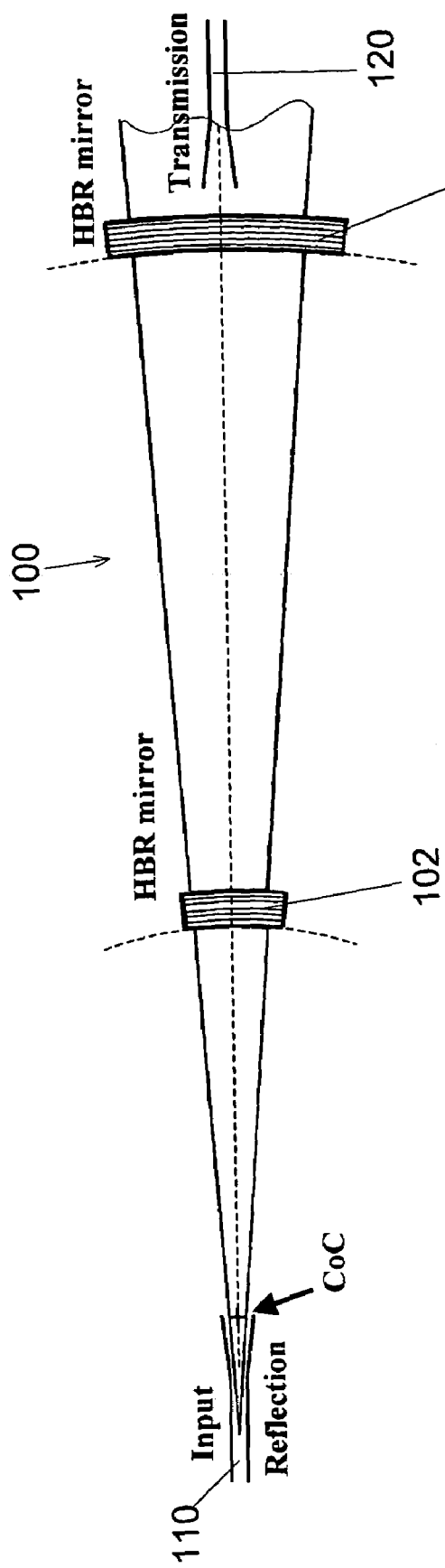
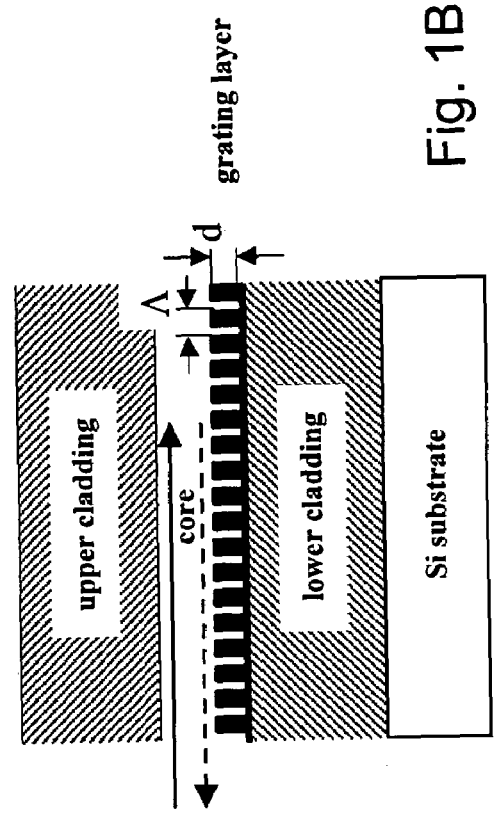
Fig. 1A
Fig. 1B

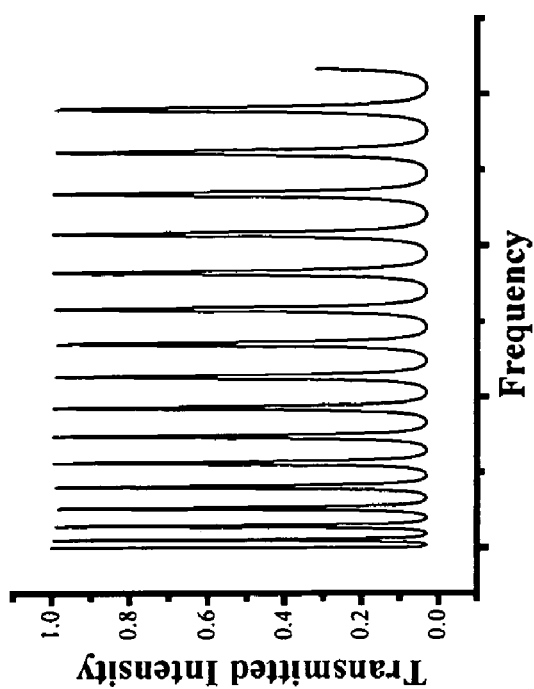
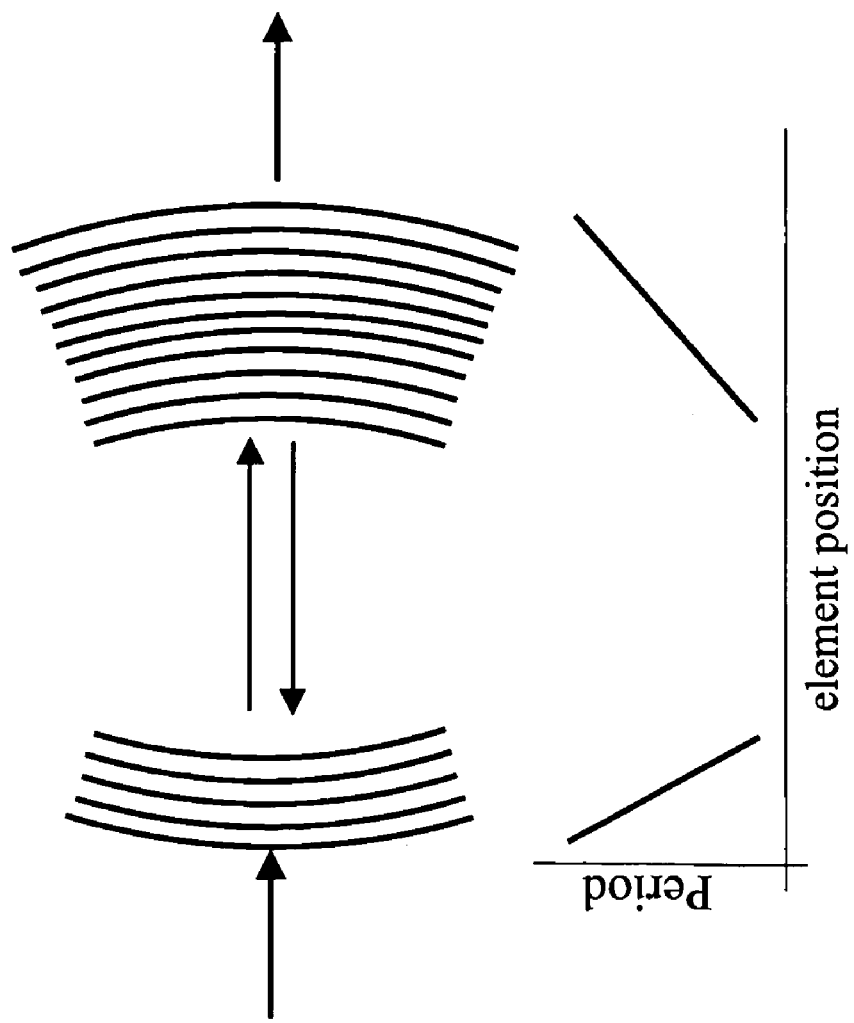
Fig. 9C
Fig. 9A
Fig. 9B

OPTICAL RESONATOR FORMED IN A PLANAR OPTICAL WAVEGUIDE WITH DISTRIBUTED OPTICAL STRUCTURES

BENEFIT CLAIMS TO RELATED APPLICATIONS

This application claims benefit of prior-filed co-pending provisional App. No. 60/604,827 filed Aug. 25, 2004, said provisional application being hereby incorporated by reference as if fully set forth herein.

BACKGROUND

The field of the present invention relates to optical resonators. In particular, optical resonators formed in planar optical waveguides with distributed optical structures (e.g., diffractive element sets) are disclosed herein.

One or more distributed optical structures (i.e., sets of diffractive elements) in a channel waveguide, an optical fiber, a slab waveguide, or another guided-wave optical structure may be used in a variety of devices for spectral filtering, laser frequency control, spectral multiplexing, optical sensing, or other functions. Two or more such diffractive element sets formed in a planar waveguide may define an optical resonator cavity, and optical resonators thus formed are disclosed herein.

Various embodiments, implementations, and adaptations of planar optical waveguides with diffractive element sets are disclosed in:

application Ser. No. 11/210,439 filed Aug. 23, 2005 in the names of Dmitri Iazikov, Christoph M. Greiner, and Thomas W. Mossberg;

application Ser. No. 11/155,327 filed Jun. 16, 2005 in the names of Christoph M. Greiner, Thomas W. Mossberg, and Dmitri Iazikov;

application Ser. No. 11/076,251 filed Mar. 8, 2005 in the name of Thomas W. Mossberg;

application Ser. No. 11/062,109 filed Feb. 17, 2005 in the names of Christoph M. Greiner, Thomas W. Mossberg, and Dmitri Iazikov;

application Ser. No. 11/055,559 filed Feb. 9, 2005 in the names of Christoph M. Greiner, Thomas W. Mossberg, and Dmitri Iazikov;

application Ser. No. 11/021,549 filed Dec. 23, 2004 in the names of Dmitri Iazikov, Christoph M. Greiner, and Thomas W. Mossberg;

application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006);

application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005);

application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005);

application Ser. No. 10/923,455 filed Aug. 21, 2004 in the names of Thomas W. Mossberg, Dmitri Iazikov, and Christoph M. Greiner (now U.S. Pat. No. 7,054,517 issued May 30, 2006);

application Ser. No. 10/898,527 filed Jul. 22, 2004 in the named of Dmitri Iazikov, Christoph M. Greiner, and Thomas W. Mossberg;

application Ser. No. 10/857,987 filed May 29, 2004 in the names of Lawrence D. Brice, Christoph M. Greiner, Thomas W. Mossberg, and Dmitri Iazikov (now U.S. Pat. No. 6,990,276 issued Jan. 24, 2006);

application Ser. No. 10/842,790 filed May 11, 2004 in the names of Thomas W. Mossberg, Christoph M. Greiner, and Dmitri Iazikov (now U.S. Pat. No. 6,987,911 issued Jan. 17, 2006);

application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004);

application Ser. No. 10/794,634 filed Mar. 5, 2004 in the names of Dmitri Iazikov, Thomas W. Mossberg, and Christoph M. Greiner (now U.S. Pat. No. 6,985,656 issued Jan. 10, 2006);

application Ser. No. 10/740,194 filed Dec. 17, 2003 in the names of Dmitri Iazikov, Thomas W. Mossberg, and Christoph M. Greiner;

application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004);

application Ser. No. 10/602,327 filed Jun. 23, 2003 in the name of Thomas W. Mossberg (now U.S. Pat. No. 6,859,318 issued Feb. 22, 2005);

application Ser. No. 10/229,444 filed Aug. 27, 2002 in the names of Thomas W. Mossberg and Christoph M. Greiner (now U.S. Pat. No. 6,678,429 issued Jan. 13, 2004);

application Ser. No. 09/843,597 filed Apr. 26, 2001 in the name of Thomas W. Mossberg (now U.S. Pat. No. 6,965,464 issued Nov. 15, 2005);

application Ser. No. 09/811,081 filed Mar. 16, 2001 in the name of Thomas W. Mossberg (now U.S. Pat. No. 6,879,441 issued Apr. 12, 2005).

Each of said applications and patents is hereby incorporated by reference as if fully set forth herein. For one or more of the references incorporated hereinabove, it may be the case that the devices, structures, embodiments, implementations, adaptations, procedures, or techniques disclosed therein may be employed, within the scope of the present disclosure or appended claims, for implementing an optical resonator in a planar waveguide.

SUMMARY

An optical apparatus comprises a planar optical waveguide having at least two sets of diffractive elements. The planar optical waveguide substantially confines in at least one transverse spatial dimension optical signals propagating therein. The two or more diffractive element sets define an optical resonator that supports at least one resonant optical cavity mode. An optical signal in one of the resonant optical cavity modes is successively incident on the diffractive elements of each of the diffractive element sets.

Objects and advantages pertaining to an optical resonator formed in a planar optical waveguide may become apparent upon referring to the disclosed exemplary embodiments as illustrated in the drawings and disclosed in the following written description or appended claims.

BRIEF DESCRIPTION OF THE DRAWINGS

FIGS. 1A and 1B are schematic top and cross-sectional views of an exemplary resonant cavity formed by diffractive element sets in a slab waveguide.

FIG. 9A is a schematic top view of a resonant cavity formed by chirped diffractive element sets. FIG. 9B is a schematic plot of the diffractive element spacing versus position for the diffractive element sets of FIG. 9A. FIG. 9C is a plot of the resulting transmission spectrum for the resonant cavity of FIG. 9A.

Figure 2B:
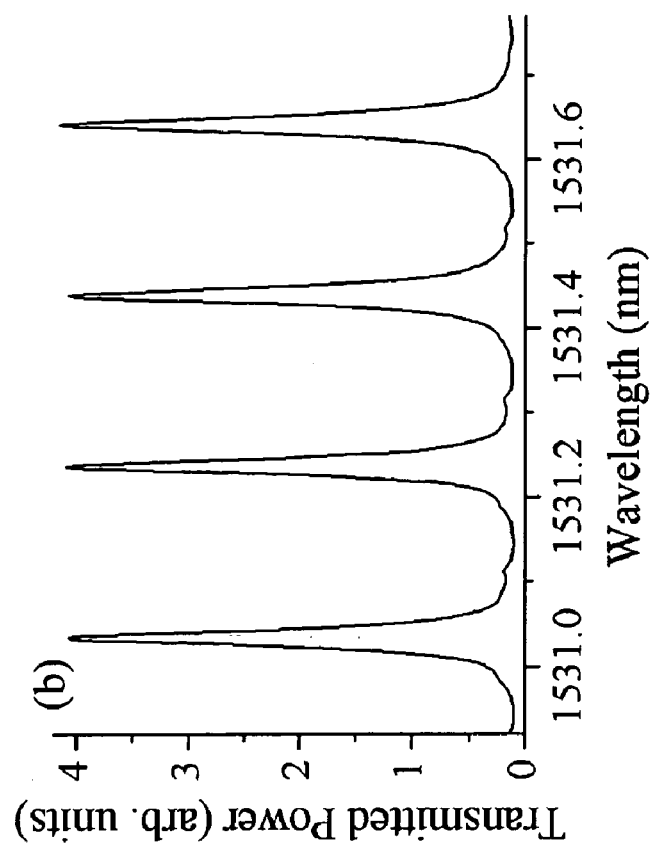
FIGS. 2A and 2B are reflection and transmission spectra, respectively, of the device of FIGS. 1A and 1B.

In the Figures, typically only a few diffractive elements are shown out of an entire diffractive element set, which may contain anywhere from a few, dozens, hundreds, or even thousands of diffractive elements. The Figures may illustrate the waveguide or diffractive elements schematically, and therefore may not show all structures in their proper shape or proportions. In many of the Figures, an optical waveguide and the diffractive elements thereof are shown in cross section. Unless specifically stated otherwise, such cross-sectional Figures may represent both channel and slab waveguides, as well as other guided-wave optical structures. The local direction of optical propagation (i.e., the longitudinal dimension) is substantially horizontal (with respect to both the orientation of such Figures as well as a substantially horizontal planar waveguide substrate, which may be present but may not be shown in all of the Figures). Two transverse dimensions are defined locally as perpendicular to the local longitudinal dimension. For both channel and slab waveguides the supported optical modes are substantially confined in the vertical transverse dimension of the cross-sectional Figures (vertical with respect to both the orientation of the Figure as well as a substantially horizontal planar waveguide substrate, if present). The horizontal transverse dimension is substantially normal to the plane of such Figures, and substantially parallel to a planar waveguide substrate (if present); a slab waveguide permits optical signal propagation in said horizontal transverse dimension, while a channel optical waveguide substantially confines the optical signal in the horizontal transverse dimension.

The embodiments shown in the Figures are exemplary, and should not be construed as limiting the scope of the present disclosure or appended claims.

DETAILED DESCRIPTION OF EMBODIMENTS

General Description of Planar Optical Waveguides with Diffractive Elements

An optical apparatus according to the present disclosure comprises an optical element having at least one set of diffractive elements. The optical element may comprise a planar optical waveguide substantially confining in at least one transverse spatial dimension optical signals propagating therein. The confined optical signals typically propagate as transverse optical modes supported, guided, or confined by the waveguide layers of the planar waveguide. These optical modes are particular solutions of the electromagnetic field equations in the space occupied by the waveguide layers. In addition, the planar waveguide may include additional layers, such as a substrate layer(s), protective layer(s), and so forth. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. Planar waveguides are sometimes also referred to as "planar lightwave circuits" (PLCs).

A simple planar waveguide may comprise a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The core or cladding(s) may comprise multiple material regions or layers having different indices. A planar waveguide may support one or more transverse modes, depending on the dimensions, structure, and refractive indices of the core and cladding. A wide range of material types may be employed for fabricating a planar waveguide, including but not limited to glasses, polymers, plastics, semiconductors, combinations thereof, or functional equivalents thereof. The planar waveguide may be formed on or secured to a substrate for facilitating manufacture, for mechanical support, and/or for other reasons. The waveguide layer(s) of a planar waveguide typically support or guide one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including any of those disclosed in the references listed and incorporated hereinabove. Each linear or curvilinear diffractive element is shaped to direct its diffracted portion of the optical signal to an output optical port. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that an optical port (input or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

A given set of diffractive elements provides dual functionality, spatially routing a diffracted portion of an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss (at least with respect to contour shape). Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure or appended claims. Particular attention is called to design and fabrication techniques disclosed in the references listed and incorporated hereinabove. The following are exemplary only, and are not intended to be exhaustive. The teachings of the present disclosure pertaining to forming an optical resonator with diffractive element sets may be implemented regardless of the method(s) employed for forming the planar waveguide or diffractive element set(s) thereof.

Diffractive elements may be formed lithographically on the surface of a planar optical waveguide, or at one or both interfaces between core and cladding of a planar optical waveguide, or at one or more interfaces between core sublayers of differing compositions or between cladding sublayers of differing compositions. Diffractive elements may be formed lithographically in the interior of a core layer or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask onto the surface of the planar waveguide (referred to herein as external photo-exposure) so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-1}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter. The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references listed and incorporated hereinabove).

An alternative approach to designing the diffractive element contours for a diffractive element set is disclosed in application Ser. No. 11/055,559 (listed and incorporated hereinabove), and comprises calculating interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by calculated interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate in the planar waveguide (referred to herein as internal photoexposure), thereby recording in the planar waveguide an interference pattern. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, insertion loss, finesse, free spectral range, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a smaller finesse may be an acceptable trade-off for achieving lower device fabrication costs in some instances, while a larger finesse may be required in other instances in spite of higher fabrication costs. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Words such as "substantially" or phrases containing such words, as used herein, shall be construed in light of this notion of "operationally acceptable" performance. Similarly, phrases describing quantities such as "desired finesse", "selected resonant wavelength", and so forth, as used in the written description or appended claims, shall be construed as specifying the quantity within an operationally acceptable range of the "desired" or "selected" quantity. The size of such an operationally acceptable range will vary according to the requirements of a specific apparatus, as described hereinabove.

Optical Resonators Formed with Diffractive Element Sets

Planar-lightwave-circuit (PLC) based optical resonators have recently attracted much attention as basis of a range of spectral filtering applications including add-drop channel filters, WDM demultiplexers, dispersion compensators, sensors, and tunable filters and modulators. Disclosed herein is an integrated resonator design employing silica-on-silicon-based holographic Bragg reflectors (HBRs) and a two-dimensional concentric Fabry-Perot architecture. The disclosed devices can be configured to be more-degenerate and thereby exhibit relatively wide acceptance angles. Additional cavity configurations comprising general HBR spacings and focusing properties with circular or generalized curvilinear diffractive element shall also fall within the scope of the present disclosure or appended claims.

Previous work on PLC-based cavities has included Fabry-Perot as well as ring resonator architectures providing single-spatial-mode functionality. Previous work on Fabry-Perot resonators have been restricted to one-dimensional ridge waveguide segments between single-surface or distributed reflectors. Ring resonators have been realized employing both high- and low-refractive-index materials. The former approach provides a large free-spectral range (FSR), yet high propagation losses have impeded practical device implementation. Q-factors of $10^6$ have been demonstrated in low-index-contrast silica-based ring resonators, but FSRs demonstrated to date have typically been limited to less than 100 GHz due to constraints on acceptable bending losses. Additional drawbacks of the ring resonator architecture are the typically polarization-dependent waveguide-to-ring-resonator coupling and ring propagation constants, as well as the general lack of design flexibility in wavelength tailoring of the coupling constant.

The folded Fabry-Perot resonator geometry disclosed in detail herein allows access to FSRs substantially exceeding those of silica-based ring resonators while the low-loss silica platform makes it fully consistent with similarly large Q-factors. HBR cavity mirrors are physically distinct elements whose reflective properties can be broadly tailored in a straightforward fashion to effect desired cavity spectral properties. The teachings set forth herein pertaining to integrated HBR-based optical resonators can be applied to design integrated versions of a wide range of resonators or resonator-based devices historically restricted to implementation in free space, i.e., in three dimensions.

FIG. 1A is a schematic top view of the slab waveguide-based asymmetric concave/convex concentric resonator cavity 100. The cavity comprises two 266-μm long HBRs 102 and 104 that function as cavity mirrors. The 4-mm spacing between mirrors yields a free spectral range of about 26 GHz. The circular contour HBR mirrors, with radii 3 mm (102) and 7 mm (104), are concentric about the point labeled "CoC". Light emerges from the end of the channel input waveguide 110 shown to the left of the cavity, expands in the open slab region at the left hand and subsequently, if resonant with one of its modes, builds up in the resonator 100. A second channel waveguide 120 behind the right cavity mirror can be used to monitor the cavity transmission. The input and output channel waveguides have a design opening of 12.7 μm, adiabatically increased from 6 μm at the die edge via a 0.5 mm-long taper. The cavity's footprint (excluding the access waveguides) is a mere 8.5 mm².

FIG. 1B is a partial cross-sectional view of either of cavity mirrors 102 and 104. In the HBR region the silica slab waveguide comprises a doped dual-layer core and bilateral 15-μm-thick cladding layers. The dual-layer core comprises a 1-μm thick grating layer which has a +3% refractive index contrast relative to the cladding and a 1.6-μm-thick core layer with a +1% refractive index contrast relative to the cladding. Depicted at the interface between the two core sublayers are cross-sections of representative lithographically-scribed grating contours. The diffractive contours, with depth d≈850 nm, consist of trenches etched into the grating layer and filled with material of the upper core sublayer. The HBR operates in first diffractive order with a contour spacing, Λ, of about 500 nm, i.e. one half of the in-medium wavelength of resonant light. Outside the grating region the thicknesses of the upper core and grating layers are 2 μm and 150 nm, respectively (the same etch that creates the HBR etches away most of the grating layer outside the cavity and in its interior). The cavity was fabricated from a laser-written reticle employing a DUV optical stepper, standard etching, deposition, and annealing processes.

Figure 2A:
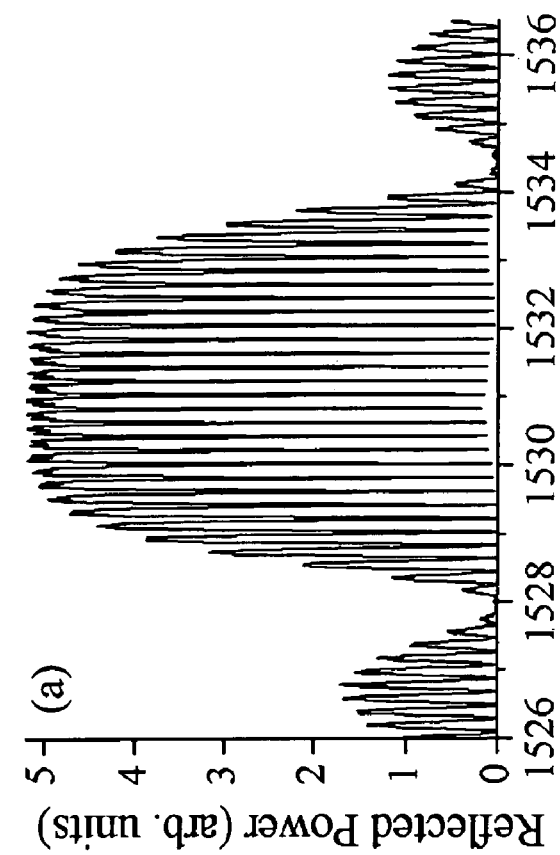

FIG. 2A shows the spectral profile of the cavity measured in retroreflection back though the input channel wave guide 110 with a TM-polarized tunable narrow-linewidth laser. The periodic dips in the reflection spectrum-correspond to the cavity transmission modes. The overall slow sinc-function-like modulation of the observed spectrum is caused by the sinc-function spectral transfer function of the unapodized HBR cavity mirrors (with estimated primary passband (FWHM)~3.9 nm). FIG. 2B shows a portion of the cavity's transmission spectrum. The cavity's free spectral range and bandpass were determined to be 25.9±0.04 and 2.8±0.2 GHz yielding a finesse of 9.2±0.6. For TE-polarized light, the bandpass and finesse were found, respectively, to be 2.56±0.14 GHz and 10.2±0.6. Error bars represent standard deviations over multiple observed cavity resonances. The TE-finesse value is higher than for TM polarization due to a slightly higher mirror reflectivity for TE polarization as is detailed in the following. The absolute intrinsic insertion loss of the cavity, measured in retro reflection, excluding fiber-to-die coupling but including channel-to-slab internal coupling, was 0.35±0.05 dB.

It is instructive to compare the measured cavity performance to theoretically expected behavior and specifically to attempt to quantify cavity loss. Examples of potential sources of loss are scattering and/or absorption within the HBRs or in the cavity's internal waveguide region and diffractive losses from the conditionally stable cavity. Furthermore, a fully two-dimensional cavity as presently considered here is highly sensitive and thus a powerful diagnostic tool to fabrication errors, such as effective index inhomgeneities of the interior slab waveguide or inaccurate lithographic rendition of the HBR contours. Such errors affect the transverse spatial coherence of the intracavity field and, if present, limit finesse. The importance of transverse spatial coherence substantially distinguishes the two-dimensional resonant cavity disclosed hereinabove from previously demonstrated one dimensional Fabry-Perot cavities. It has been found that fabrication errors affecting the transverse wave front coherence were substantially negligible, so that the measured performance of the two-dimensional cavity substantially corresponds to that of a one-dimensional cavity with reflectivity-limited finesse.

Based on measurement of other HBRs fabricated simultaneously with the Fabry-Perot cavity of FIGS. 1A–1B, it was determined that the extinction length (1/e-distance of electric field) of the HBRs employed to be 375±10 μm for TM polarization and 355±10 μm for TE polarization. Based on these values the estimated peak reflectivity for each 266-μm long HBR cavity mirror is 68.6±1.8% for TM polarized input light and 71.8±1.7% for TE polarization, and the estimated cavity finesse is 8.3±0.6 for TM polarization and 9.4±0.7 for TE polarization. The relatively low mirror reflectivity of this embodiment was chosen since losses were initially unknown and resonator characterization by use of its transmission produces largest signal levels when the mirror transmittance is at least comparable with the round trip loss. Comparison of theoretically derived versus measured finesse values indicates that the cavity loss is sufficiently small so as to be substantially negligible. The observed finesse allows an upper limit to be estimated for the round trip cavity field loss (HBRs and internal slab waveguide region) of about 1.2% for TM polarization and about 1.8% for TE polarization. The demonstrated cavity Q-factor of almost $10^5$ is limited in this embodiment only by the relatively low mirror reflectivity. Mirror reflectivity may be usefully increased until transmission and loss are comparable. With the upper limits on loss found here it is expected that a cavity Q of $10^6$ or more may be readily obtainable providing Q-value performance similar to that offered by silica-based ring resonators.

It is well-known from optical resonator theory that phase errors affecting the transverse spatial coherence can constrain the maximally achievable finesse. Specifically, an optical path length variation of $\lambda/M$ across a cavity's aperture implies a (mirror-figure-limited) finesse of $M/2$. Consequently, our finesse result indicates that in the presently fabricated device phase errors due to inaccurate lithographic rendition or refractive index variations are limited to only about $\lambda/20$ or smaller. The sensitivity of 2D resonators to transverse spatial coherence provides a useful sensor for lateral refractive index uniformity, especially when the resonator is fabricated without a cladding (except for the medium to be sensed) or with a thin cladding. When the guided modes sample a material of interest the cavity's reflective and transmissive properties will reflect changes in the material's spatial refractive index uniformity, average refractive index, or absorptivity.

In the embodiment of FIGS. 1A–1B, a weak polarization-dependence of the cavity transmission spectrum was measured. Specifically, TE-polarized input light was found to be resonant with the cavity at wavelengths red-shifted by ~80 pm from the TM resonances. Preliminary results on HBR test structures indicate that tuning of HBR birefringence properties via structural and compositional tailoring of the grating layer morphology is possible, as disclosed in one or more of the references incorporated hereinabove. Such tuning may be exploited to compensate propagation constant differences found in the cavity interior thus yielding a polarization-insensitive spectral response. It has also been noted that any polarization-dependence of the mirror reflectivity will affect only the width of the cavity resonances but not their peak transmission. In the limit of high reflectivity, the present cavity type does not exhibit appreciable true polarization-dependent loss but rather a small difference in the reflection band width, an effect that is often irrelevant to resonator operation.

Devices Incorporating Optical Resonators

Figure 3:
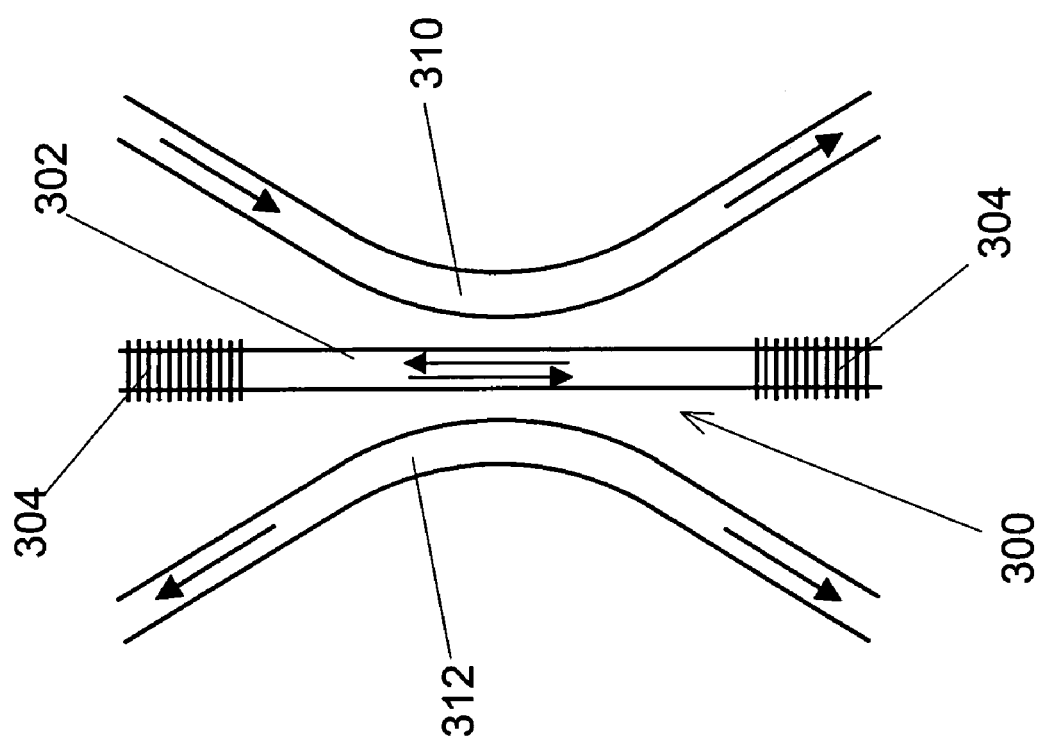
FIG. 3 is a schematic top view of a resonant cavity formed by diffractive element sets in a channel waveguide and coupled to other channel waveguides.

FIG. 3 shows an embodiment within the scope of the present disclosure or appended claims. A standing wave resonant cavity 360 is formed in a channel waveguide. The cavity mirrors 304 consist of one-dimensional lithographically-written channel waveguide Bragg gratings spaced by a certain physical distance. Coupling in and out of the cavity can occur via the adjacent curved channel waveguides 310 and 312. The coupling mechanism between adjacent channel waveguides is well established in the art. Variations of the embodiment shown in FIG. 3 include devices wherein only one channel waveguide is being used to couple in and out of the cavity.

Figure 4:
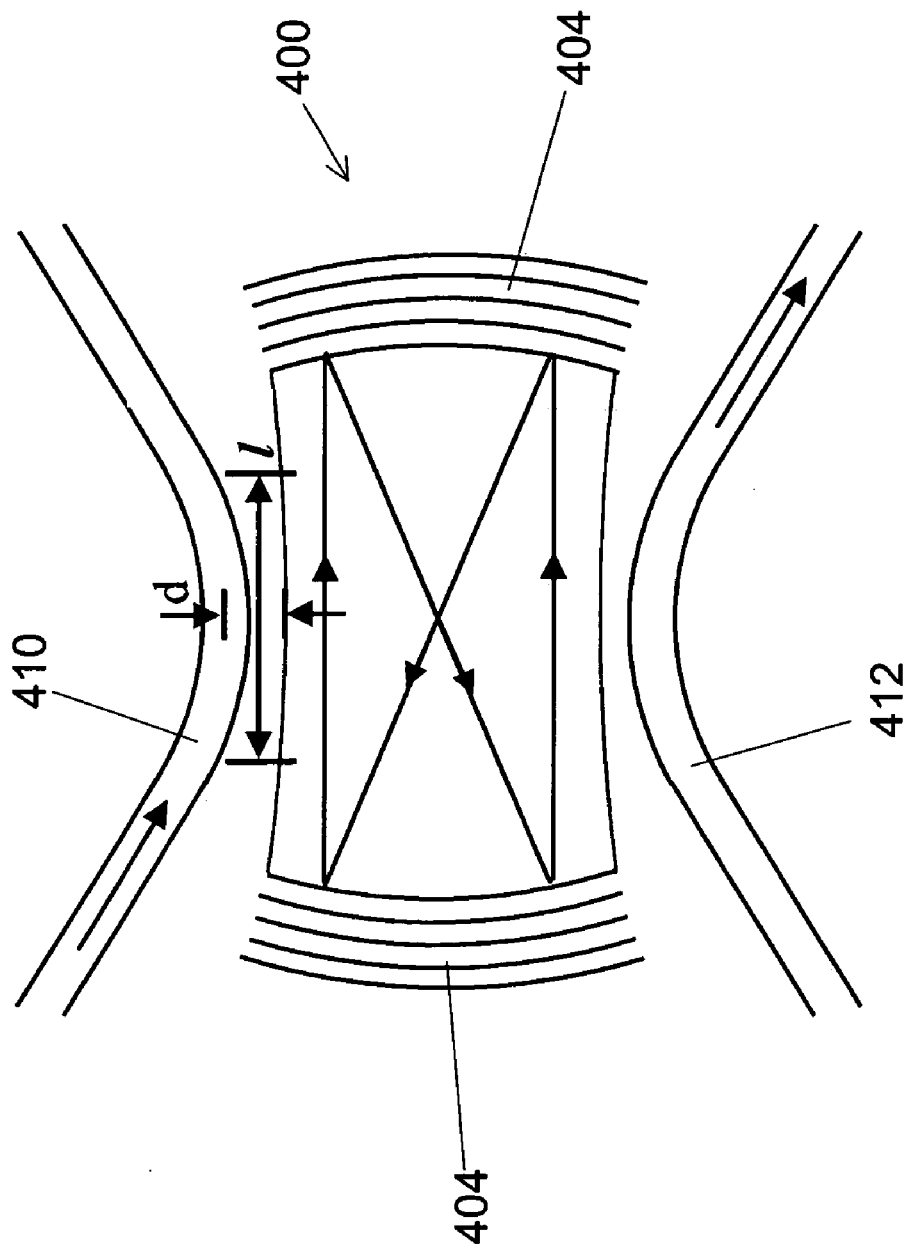
FIG. 4 is a schematic top view of a resonant cavity formed by diffractive element sets in a slab waveguide and coupled to channel waveguides.

FIG. 4 shows an additional embodiment within the scope of the present invention. A two-dimensional resonant cavity 400 is formed between two holographic Bragg reflectors 404 as described previously. In the present embodiment the reflectivity of both of the cavity mirrors is set to nominally 100%. The cavity shown in the figure is a confocal Fabry-Perot resonator used in the bow-tie configuration. In this configuration the cavity functions as a traveling wave rather than a standing wave cavity. Coupling in and out of the cavity occurs via the adjacent curved channel waveguides 410 and 412. The coupling constant between channel waveguides and two-dimensional cavity depends on the width of the gap between them, d, as well as the interaction length, l.

It should be noted in relation to any resonator designed according to the teachings of the present disclosure that altering the cavity mirror reflectivity affects the spectral shape of the cavity resonances, e.g. their spectral bandpass, and altering the mirror reflectivity may be used to tailor the spectral bandpass or other operational parameters such as the Q factor or the cavity finesse to a desired value. The reflectivity values of the cavity mirrors need not be equal; differing reflectivity values may be chosen. As is known in the art of resonator optics, the strength of a cavity's on-resonance transmission and reflection signals depends on the specific balance or imbalance of the cavity mirror reflectivities and cavity operational parameters may be customized based on the selected reflectivity values.

Figure 5:
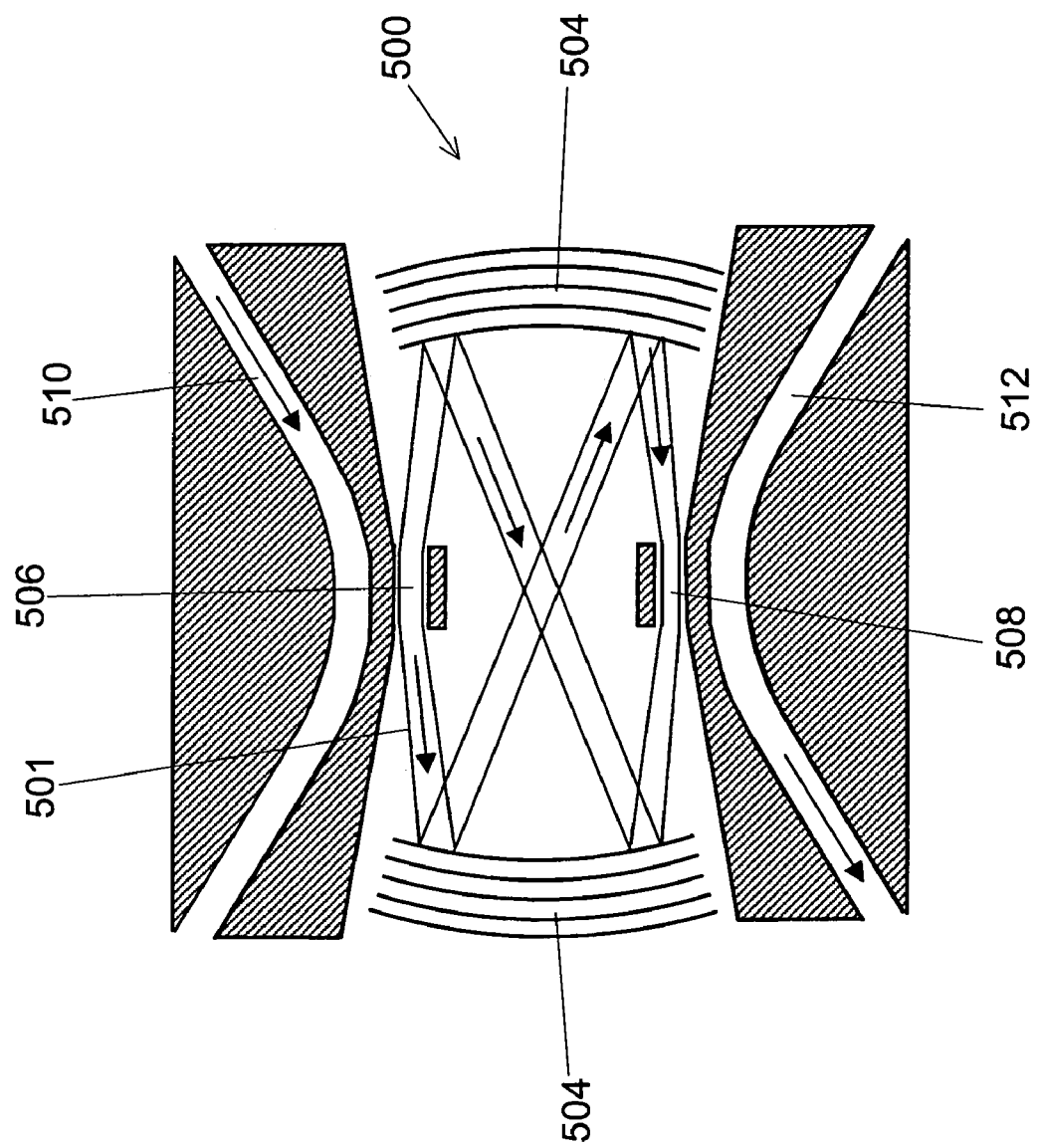
FIG. 5 is a schematic top view of a resonant cavity formed by diffractive element sets in a slab waveguide and coupled to channel waveguides.

FIG. 5 depicts a further embodiment in accordance with the present invention which provides coupling from a single-mode channel waveguide 510 to one specific mode 501 of the confocal Fabry-Perot cavity 500. The figure shows how the latter mode is defined by cavity mirrors 504 and small channel waveguide segments 506 and 508 located within the confines of the two-dimensional cavity 500. In the figure, the hatched areas consist of lower-index material, i.e. they do not have a slab waveguide core. Resonant light coupled into the cavity's channel waveguide segment 506 from the first channel waveguide 510 builds up in the cavity. Light may be coupled out of the cavity 500 into channel waveguide 512 at the intracavity channel waveguide segment 508. This cavity geometry may function as an add-drop filter with two distinct output ports: the first for the signal throughput that is not resonant with the cavity that exits via channel waveguide 510, and a second for a signal resonant with the cavity that exits via channel waveguide 512. In this modified confocal cavity, the mirror spacing is set so that light exiting the lateral channel waveguide segments is approximately collimated on striking the mirror. After collimation and propagation to the opposite mirror, the light is focused for entry into the opposite lateral channel waveguide segment and so on. Loosely speaking, the cavity is longer than the standard confocal length by the length of the lateral channel waveguides.

It should be noted that the present method to design slab-waveguide-based two-dimensional optical resonators employing distributed diffractive structures enables one to make integrated analogues of many popular resonators used in free space optics. These integrated cavities are in fact subject to similar requirements on spatial mode matching and preservation of transverse coherence and have similar stability criteria as their fully 3D cousins which are familiar to those skilled in the art of free-space optical resonator theory. Integrated slab-waveguide based cavities built with distributed diffractive structures can be single spatial mode or mode-degenerate. Integrated cavities may have multiple distributed diffractive mirrors.

Integrated optical cavities may be employed to provide multi-passing of samples, thereby enhancing the interaction length between the probing light and samples to be investigated. This in turn improves measurement or sensing sensitivities when performing absorption measurements on samples with small absorption coefficients or when detecting minute refractive index changes. The cavity enhances the effective interaction length by a factor proportional to the finesse.

Figure 6:
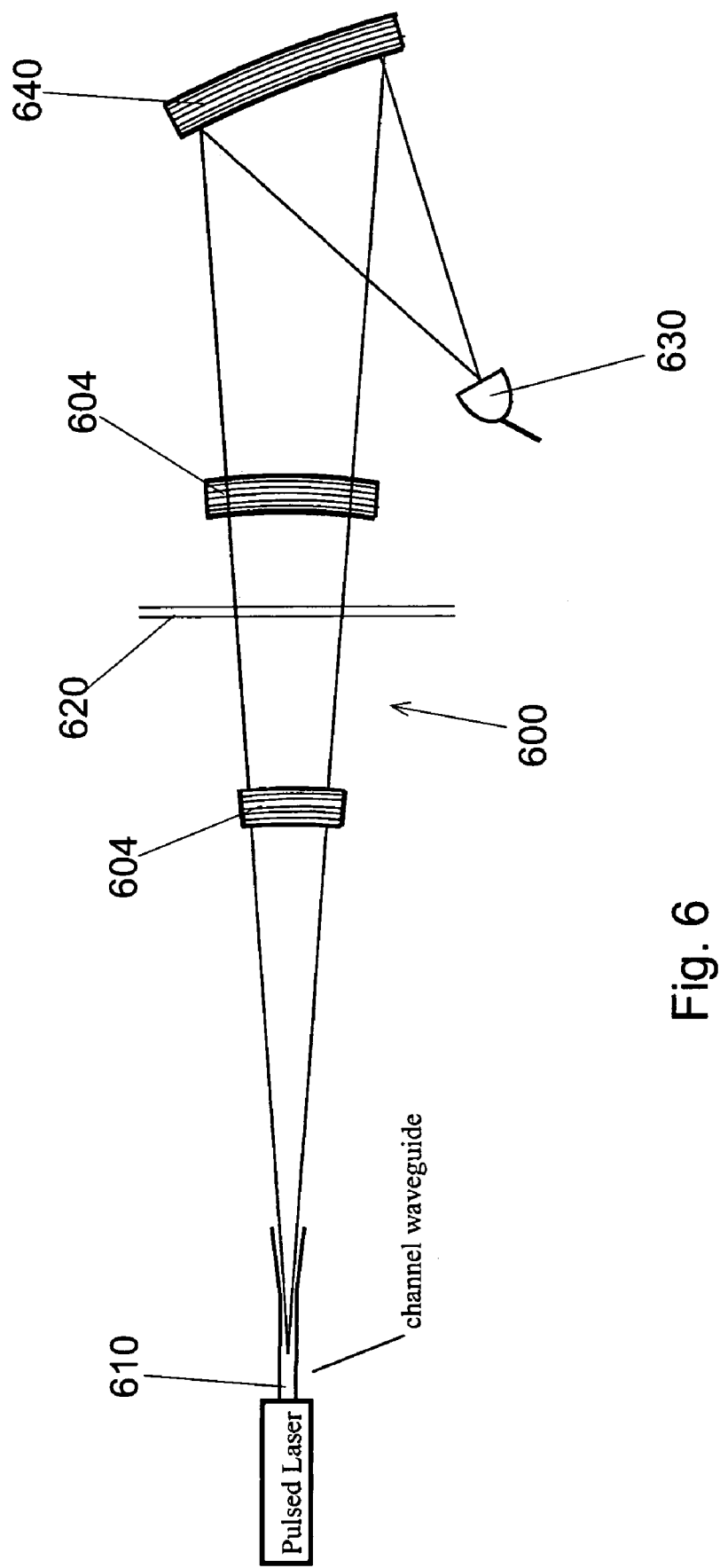
FIG. 6 is a schematic top view of a resonant cavity formed by diffractive element sets in a slab waveguide and incorporated into an optical spectrometer.

FIG. 6 depicts an embodiment that provides a fully integrated tool for high sensitivity absorption measurements, specifically an integrated cavity ring down spectrometer. A laser pulse with pulse width short compared to the cavity length is coupled, by use of a channel waveguide, into the integrated cavity 600, which in this embodiment comprises a concave-convex concentric Fabry-Perot cavity set up in single-mode configuration. The distributed diffractive structures 604 employed as cavity mirrors are highly reflecting, e.g. have a reflectivity greater than about 99%. Other reflectivities may be employed. The sample, either liquid or dissolved in a suitable liquid solvent, is introduced into the cavity by use of a micro channel 620 which runs perpendicular to the cavity axis or more preferably along the local wavefronts of the cavity mode. Multiple channels or microchannels arranged along the cavity axis may be used to increase sensitivity. To observe cavity loss that is mostly dominated by sample absorption rather than other effects, it may be advantageous to choose liquid samples or liquid solvents with a refractive index close to that of the effective index of the waveguide to reduce reflective losses not caused by sample absorption. Note that it also may be possible to eliminate, e.g. by comparison, subtraction, or ratio, non-absorption-related loss (such as reflections at the edge of the microchannel) from the overall measurement by use of a reference cavity. The light pulse passes the sample and, if the sample is resonant with frequencies within the pulse spectrum, will exhibit an exponential cavity ring-down decay (measured in transmission with detector 630) that is faster than that occurring when a non-resonant sample or no sample is present. Both the sample absorption and the cavity mirror reflectivity influence the timescale of the exponential pulse intensity decay. It generally is advantageous to choose a sufficiently high mirror reflectivity so the intensity decay is long compared to the response time of the photo detector. In the embodiment shown in FIG. 6 the cavity transmission is collected and focused onto a fast photo detector 630 by an additional distributed diffractive structure 640. The present embodiment is a specific example of an integrated absorption spectrometer based on the disclosed resonant optical cavities. Other implementations of absorption spectroscopy employing optical resonators are known in the art and can be realized using resonant cavities based on distributed diffractive structures.

The cavity's sensitivity enhancement factor applies also to dispersive measurement and sensing techniques. A further embodiment addresses this application. In FIG. 6, the micro channel 620 (or multiple microchannels) may contain a mostly dispersive fluid (assumed to be non-absorbing in the present example) with a refractive index to be measured or having refractive index fluctuations to be detected or quantified. A continuous wave laser with a scan range of about one cavity free spectral range is coupled into the cavity. The cavity transmission is again detected by a photo detector 630. The signal emerging from the cavity is a modulated intensity signal whose intensity maximum corresponds to the frequency where the laser becomes resonant with the cavity and whose minimum corresponds to being off cavity resonance. The laser is scanned, e.g. in a linear fashion. A time origin is chosen, e.g. the beginning of the laser scan with respect to which the time duration to the maximum intensity point is measured. As the index of the fluid in the micro channel changes, the cavity resonance frequency resonance will change accordingly and consequently the temporal location of time of highest detected intensity, i.e. when the scanning laser becomes resonant with the altered cavity resonance will change as well. The detected time difference between old and new location of the intensity maximum can be used to quantify the refractive index change the fluid has undergone. Alternatively, the frequency differential between the old and new cavity resonance frequency may be determined directly, e.g. through automatic or manual read-off from a wave meter or other appropriate instrument, and the index information can be obtained this way. Whatever specific method is employed, the cavity resonance shift enables determination of a refractive index change of the liquid or other sample. Such monitoring of refractive index changes may be important, e.g. in organic synthesis, where the refractive index of a solution of reagents reflects relative concentrations. An error signal may be derived from the peak intensity time differential or other appropriate changes caused by the cavity resonance shift and used to correct the chemical mixture by appropriate means. The sensitivity enhancement through the cavity follows from the fact that the phase change caused by the refractive index change is multiplied by a factor proportional to the cavity finesse. It should be noted that the embodiments disclosed herein that include a two-dimensional integrated resonant cavity may be generalized to channel waveguide-based one-dimensional resonator structures while remaining within the scope of the present disclosure or appended claims.

Rather than monitoring the refractive index changes of a sample in a micro channel contained in the cavity it is also possible to monitor temperature changes of objects attached to the outside of the planar waveguide containing the integrated resonator structure. As the temperature of the outside object changes the refractive index of the cavity will change and this change will again affect the cavity resonance frequency. Compared to traditional fiber-Bragg-grating-based temperature sensing, an advantage of the present temperature sensing method is its enhanced sensitivity as well as the fact that the temperature of a surface rather than only along a line may be monitored.

Figure 7:
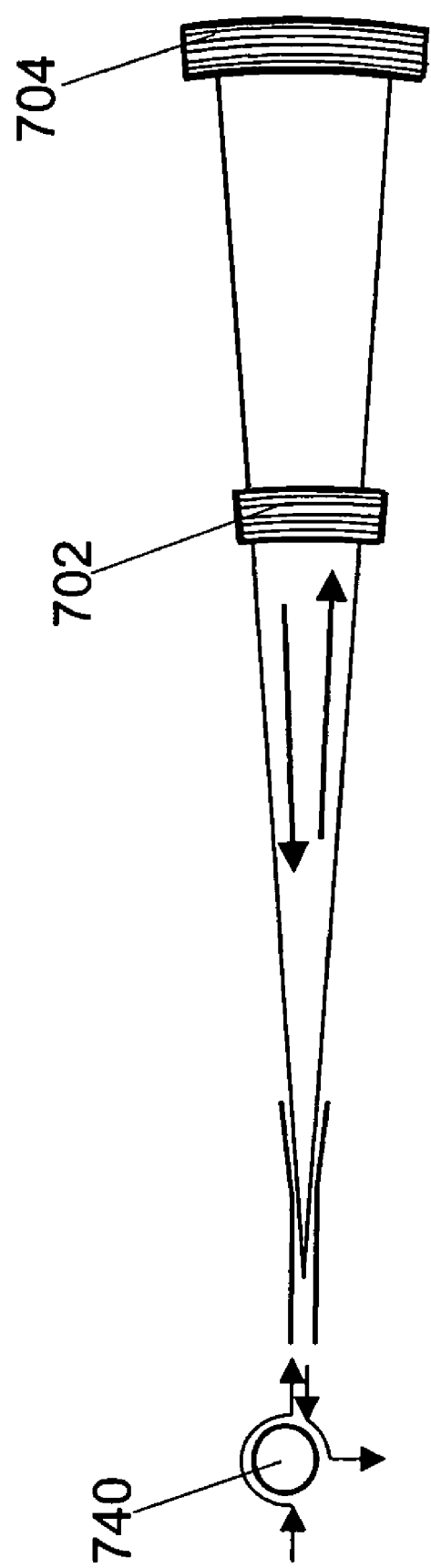
FIG. 7 is a schematic top view of a resonant cavity formed by diffractive element sets in a slab waveguide and configured as a Gires-Tournois etalon.

FIG. 7 shows another embodiment in accordance with the present invention. Here two distributed diffractive structures 702 and 704 have been arranged to form a Gires-Turnois etalon. The second (back reflecting) distributed structure 704 is maximally reflecting. Tuning of the cavity may occur via insertion of an electro-optic material, e.g. an electro-optic polymer, temperature, or other means known in the art. It is well-established in the art that tunable cavities of the Gires-Turnois type can be used as a phase modulator as well as for tunable dispersion compensation. The embodiment of FIG. 7 represents a fully-integrated analogue of this cavity based-on distributed diffractive structures. In FIG. 7 the reflected signal is dropped from the input direction by use of a circulator 740, which may be either a discrete or integrated component.

Figure 8:
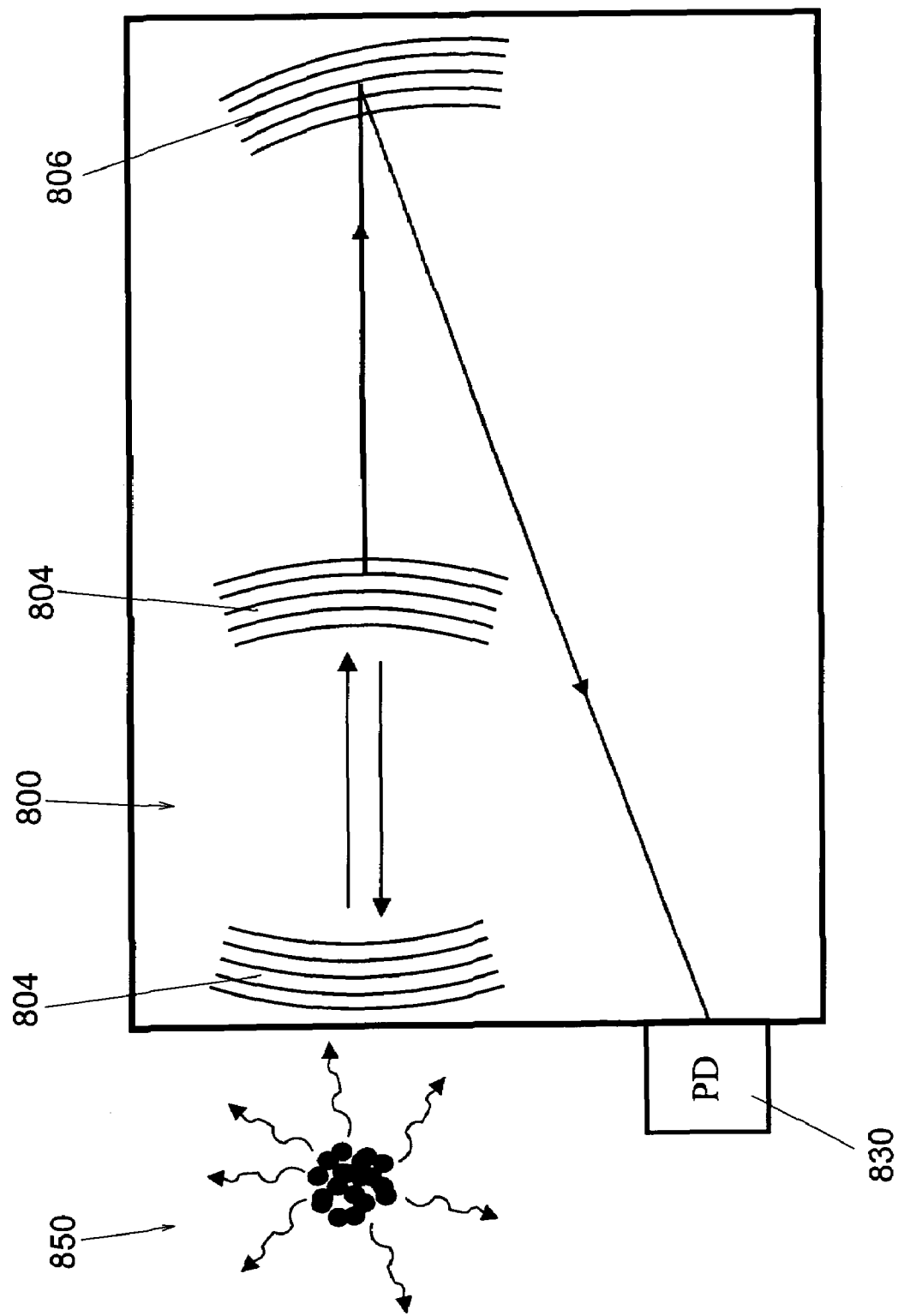
FIG. 8 is a schematic top view of a resonant cavity formed by diffractive element sets in a slab waveguide and incorporated into an optical spectrometer.

FIG. 8 depicts a confocal Fabry-Perot optical resonator 800 in the bow-tie configuration based on distributed diffractive structures 804. One advantage of this type of cavity is that it supports wavelength-degenerate optical modes and consequently has a large collection angle, making it an ideal tool for spectroscopy. The collection of light to be analyzed can occur either from a sample 850 located outside the cavity (as in FIG. 8), or as previously shown by inserting samples into the cavity interior via, e.g., a micro-channel. Tuning of the cavity for spectral analysis may be achieved by any suitable means including temperature or mechanical stress. A focusing distributed optical structure 806 collects light from the cavity output and directs it onto an detector 830 located at the edge of the device.

Resonant optical cavities and active media form the basis of many active photonics devices. Inserting into an optical cavity a resonant optically- or electronically-28 pumped medium provides a basis for a laser. Resonant optical cavities may be used to enhance nonlinear optical interaction such as second and third harmonic generation and general four wave mixing. Q-switching of cavities forms the basis of pulsed lasers. Using integrated optical resonators based on distributed diffractive structures, any of these devices may be readily implemented in an integrated slab- and channel-waveguide environment. Use of resonator types disclosed or claimed herein for aforementioned purposes shall fall within the scope of the present disclosure or appended claims.

The diffractive elements within HBRs may be arranged in various ways to provide useful resonator function. For example, the spacing of diffractive elements within an HBR may be chirped to provide reflectivity over a wide spectral region or to construct a resonator with a free-spectral range that changes with frequency. In FIG. 9A, a two-mirror resonator is shown defined by two spatially-chirped HBR mirrors. In FIG. 9B, the variation in spatial period as a function of position within the HBR mirrors is shown for the mirrors of the resonator of FIG. 9A. The fractional change in period may be a small (e.g., less than 1%) or it may be larger depending on the desired overall reflective bandwidth required. The diffractive elements within the two HBRs and having corresponding spatial periods are designed to support a spatial mode of desired properties. Owing to the chirp of the diffractive element periods within the HBRs, the effective length of the cavity is frequency dependent and the free-spectral range of the cavity changes with frequency (FIG. 9C). The slope of the period chirp of the two HBRs is shown in this example to be opposite in sign and of unequal magnitude. The period slope within the two (or more) HBRs comprising the cavity may have any desired relation in terms of sign and magnitude. The slope relationship shown in FIG. 9B provides that light within the cavity is red-shifted relative to diffractive regions it circulates through. This configuration provides a low level of out of plane scattering loss and allows for maximal finesse when confined light must circulate through non-resonant HBR sections. It is not necessary that the HBRs are configured with linear period chirps.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the present disclosure or appended claims. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii)-two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

What is claimed is:

1. An optical apparatus, comprising a planar optical waveguide having at least two sets of diffractive elements, the planar optical waveguide substantially confining in at least one transverse spatial dimension optical signals propagating therein, wherein:

the two diffractive element sets define an optical resonator that supports at least one resonant optical cavity mode;

an optical signal in one of the resonant optical cavity modes is successively incident on the diffractive elements of at least one of the diffractive element sets; and the diffractive elements of at least one of the sets are collectively arranged within the optical medium so as to exhibit a positional variation in amplitude, optical separation, or spatial phase over some portion of the set, the diffractive elements of the set being collectively arranged so as to apply a transfer function to the optical signal successively incident on the diffractive elements of the set, the transfer function being determined at least in part by said positional variation in amplitude, optical separation, or spatial phase exhibited by the diffractive elements of the set.

2. The optical apparatus of claim 1 wherein the planar optical waveguide comprises a silicon guiding layer.

3. The optical apparatus of claim 1 wherein the planar optical waveguide comprises a doped silica guiding layer.

4. The optical apparatus of claim 1 wherein the planar optical waveguide comprises a polymer guiding layer.

5. The optical apparatus of claim 1 further comprising a channel optical waveguide, wherein the channel waveguide and the optical resonator are arranged so that an optical signal resonant with a resonant optical cavity mode is coupled between the channel waveguide and the optical resonator.

6. The optical apparatus of claim 5 wherein the optical resonator comprises a 2D ring resonator.

7. The optical apparatus of claim 5 wherein the optical resonator comprises a 2D confocal Fabry-Perot resonator in a bow-tie configuration.

8. The optical apparatus of claim 5 wherein the optical resonator comprises a 2D standing-wave resonator.

9. The optical apparatus of claim 5 wherein the optical resonator comprises a channel-waveguide standing-wave resonator.

10. The optical apparatus of claim 5 further comprising an intra-cavity channel optical waveguide segment within the optical resonator, wherein:

at least one of the resonant optical cavity modes is at least partly confined by the intra-cavity channel optical waveguide segment; and the intra-cavity channel optical waveguide segment is positioned for transverse optical coupling with the channel optical waveguide.

11. The optical apparatus of claim 10 wherein the optical resonator comprises a 2D ring resonator.

12. The optical apparatus of claim 10 wherein the optical resonator comprises a 2D confocal Fabry-Perot resonator in a bow-tie configuration.

13. The optical apparatus of claim 10 wherein the optical resonator comprises a 2D standing-wave resonator.

14. The optical apparatus of claim 1 further comprising:
a first channel optical waveguide; and
a second channel optical waveguide,
wherein the first and the second channel optical waveguides and the optical resonator are arranged so that an optical signal resonant with a resonant optical cavity mode is coupled between the first and the second channel optical waveguides through the optical resonator.

15. The optical apparatus of claim 14 wherein the optical resonator comprises a 2D ring resonator.

16. The optical apparatus of claim 14 wherein the optical resonator comprises a 2D confocal Fabry-Perot resonator in a bow-tie configuration.

17. The optical apparatus of claim 14 wherein the optical resonator comprises a 2D standing-wave resonator.

18. The optical apparatus of claim 14 wherein the optical resonator comprises a channel-waveguide standing-wave resonator.

19. The apparatus of claim 14 further comprising:
a first intra-cavity channel optical waveguide segment within the optical resonator; and
a second intra-cavity channel optical waveguide segment within the optical resonator,
wherein:
at least one of the resonant optical cavity modes is at least partly confined by the first and the second intra-cavity channel optical waveguide segments;
the first intra-cavity channel optical waveguide segment is positioned for transverse optical coupling with the first channel optical waveguide; and
the second intra-cavity channel optical waveguide segment is positioned for transverse optical coupling with the second channel optical waveguide.

20. The optical apparatus of claim 19 wherein the optical resonator comprises a 2D ring resonator.

21. The optical apparatus of claim 19 wherein the optical resonator comprises a 2D confocal Fabry-Perot resonator in a bow-tie configuration.

22. The optical apparatus of claim 19 wherein the optical resonator comprises a 2D standing-wave resonator.

23. The apparatus of claim 19, wherein the apparatus is arranged to function as a channel-adding multiplexer or as a channel-dropping demultiplexer.

24. The optical apparatus of claim 1 further comprising:
a sample chamber;
a light source; and
a photodetector,
wherein:
the light source is arranged for launching an optical signal into at least one of the resonant optical cavity modes;
the sample chamber is at least partly within the optical resonator; and
the photodetector is arranged for receiving at least a portion of the launched optical signal that is transmitted by the optical resonator.

25. The apparatus of claim 24, wherein:
the light source is a pulsed light source; and
the photodetector is arranged for detecting a cavity ring-down signal from the optical resonator.

26. The apparatus of claim 24, wherein:
the light source is a wavelength-scanned light source; and
the photodetector is arranged for detecting a shift of a resonance wavelength of the optical resonator.

27. The optical apparatus of claim 1 further comprising an electro-optic or thermo-optic medium at least partly within the optical resonator, wherein:
one of the diffractive element sets is arranged so as to exhibit maximal reflectivity and the other of the diffractive element sets is arranged so as to exhibit less than maximal reflectivity, the optical resonator being thereby arranged to function as a Gires-Tournois interferometer; and
the Gires-Tournois interferometer is arranged so as to be tuned by a control signal applied to the electro-optic or thermo-optic medium.

28. The optical apparatus of claim 1 wherein:
the two diffractive element sets define an optical resonator that supports multiple degenerate resonant optical cavity modes; and
the diffractive element sets are arranged so that an optical signal launched into the optical resonator couples into multiple degenerate resonant optical cavity modes.

29. The optical apparatus of claim 1 wherein spacing between successive diffractive elements varies among the diffractive elements of at least one of the sets, so that a free spectral range exhibited by the optical resonator varies with wavelength.

30. The optical apparatus of claim 29 wherein the spacing between successive diffractive elements of one of the diffractive element sets is substantially linearly chirped in one direction, and the spacing between successive diffractive elements of the other of the diffractive element sets is substantially linearly chirped in the other direction, the optical resonator thereby being arranged so as to exhibit a free spectral range that varies substantially linearly with optical frequency.

31. The optical apparatus of claim 1 wherein:
regions of the planar waveguide that include the diffractive element sets comprise an upper cladding layer, a lower cladding layer, and a multi-layer core between the cladding layers;
the multi-layer core comprises a grating layer and a core layer each having a refractive index higher than those of the upper and lower cladding layers, the grating layer refractive index being higher than the core layer refractive index; and
each diffractive element comprises a trench formed in the grating layer and filled with material from a lower-index layer.

32. The optical apparatus of claim 31, wherein the index contrast between the cladding layers and the core layer is about 1% and the index contrast between the cladding layers and the grating layer is about 3%.

33. The optical apparatus of claim 31, wherein the grating layer comprises doped silica, the core layer comprises doped silica, and the cladding layers comprise silica or doped silica.

34. The optical apparatus of claim 31, wherein:
regions of the planar waveguide that do not include diffractive element sets comprise an upper cladding layer, a lower cladding layer, and a multi-layer core between the cladding layers;
the multi-layer core comprises a grating layer and a core layer each having a refractive index higher than those of the upper and lower cladding layers, the grating layer refractive index being higher than the core layer refractive index; and the thickness of the grating layer in regions of the planar waveguide that do not include diffractive elements is substantially equal to the thickness of the grating layer within regions that include diffractive element sets.

35. The optical apparatus of claim 31, wherein regions of the planar waveguide that do not include diffractive element sets comprise an upper cladding layer, a lower cladding layer, and a single-layer core between the cladding layers.

36. A method for forming an optical apparatus comprising a planar optical waveguide having at least two sets of diffractive elements, the planar optical waveguide substantially confining in at least one transverse spatial dimension optical signals propagating therein, the method comprising:
forming the planar optical waveguide; and
forming the diffractive elements,
wherein:
the two diffractive element sets define an optical resonator that supports at least one resonant optical cavity mode;
an optical signal in one of the resonant optical cavity modes is successively incident on the diffractive elements of at least one of the diffractive element sets; and
the diffractive elements of at least one of the sets are collectively arranged within the optical medium so as to exhibit a positional variation in amplitude, optical separation, or spatial phase over some portion of the set, the diffractive elements of the set being collectively arranged so as to apply a transfer function to the optical signal successively incident on the diffractive elements of the set, the transfer function being determined at least in part by said positional variation in amplitude, optical separation, or spatial phase exhibited by the diffractive elements of the set.

37. The method of claim 36, wherein at least one of the diffractive element sets is formed by photoreduction lithography.

38. The method of claim 36, wherein at least one of the diffractive element sets is formed by replication of a master diffractive element set.

* * * * *